United States Patent
Maurer

[15] 3,693,485
[45] Sept. 26, 1972

[54] MULTI-SPINDLE AUTOMATIC LATHE

[72] Inventor: René Maurer, 29, rue des Gorges, 2740 Moutier, Switzerland

[22] Filed: May 21, 1970

[21] Appl. No.: 39,310

Related U.S. Application Data

[63] Continuation-in-part of Ser. No. 746,621, Jan. 22, 1968, abandoned.

[52] U.S. Cl. .............................. 82/3, 29/38 B
[51] Int. Cl. .............................. B23b 9/04
[58] Field of Search .............. 82/3, 2.7; 29/38.2

[56] References Cited

UNITED STATES PATENTS

| 1,955,220 | 4/1934 | Biewend et al. | 82/3 |
| 2,614,446 | 10/1952 | Miller | 82/3 |
| 3,209,627 | 10/1965 | Holmes | 82/2.7 |
| 1,342,963 | 6/1920 | Hudson | 29/38.2 |
| 1,254,816 | 1/1918 | Lees | 29/38.2 |

Primary Examiner—Leonidas Vlachos
Attorney—Robert E. Burns and Emmanuel Lobato

[57] ABSTRACT

Automatic lathe for use in the watchmaking industry having a bar-holding headstock provided with means for advancing the bars axially and a turret mounting tool holders working tools operable radially of the turret and end tool holders mounting tools operable axially. The headstock has as many bar-holding elements as there are radially operated tool holders for working tools and an equal member of end tool holders operable axially.

9 Claims, 6 Drawing Figures

MULTI-SPINDLE AUTOMATIC LATHE

The present application is a continuation-in-part to application Ser. No. 746,621, filed Jan. 22, 1968 and now abandoned by the same applicant and relates to improvements in multi-spindle automatic lathes especially for use in the watchmaking field.

Multi-spindle lathes used until now in the watchmaking field do not comprise rotating bar-feed headstocks sliding in a mounting moving in relation to the tools. When the headstocks are fixed the necessary tools for machining parts have a transversal movement. The latter method is inconvenient in that the uses of the lathe are limited when it is necessary to machine very small parts used in watchmaking.

A known lathe disclosed by U.S. Pat. No. 452,495 is an automatic lathe with two spindles but having a fixed headstock.

Another known automatic multi-spindle lathe with four spindles described in U.S. Pat. No. 992,277 also has a fixed headstock. On the other hand, with a single spindle automatic lathe, for example the Swiss type automatic lathe described in U.S. Pat. No. 2,417,277, the possibility of having a headstock move in relation to the tools is already known as is the addition of an automatic feed which supplies the headstock with a new bar of material to be machined while the headstock is still running. However, up to the present time, these two features could only be adapted to lathes with a single spindle headstock.

The aim of the present invention relates to an automatic lathe for use in the watchmaking field to machine bars, comprising a frame, a turret mounted thereon, at least two headstocks forming holders for said bars being parallel and slidingly mounted in said turret, and at least two parallel guiding barrels spaced from and in line with said headstocks for engaging the other ends of said bars, a first carrier mounted stationary on said frame surrounding said guiding barrels and carrying at least two radial tool holders radially displaceable and a second carrier mounted stationary on said frame spaced from said first carrier and carrying at least two parallel axially displaceable end tool holders, the number of the stockheads, said guiding barrels and said axial and end tool holders being equal, and means for longitudinal movement of the said headstocks in the said turret.

Another object of the invention relates to the said means for longitudinal displacement which can act on each headstock individually or is able to act on all headstocks. Of preference, means for rotating the guide barrels during the rotation of the headstocks and/or for the automatic feed of the bars to be machined, are provided.

Referring to the accompanying drawing.

Figure 1:
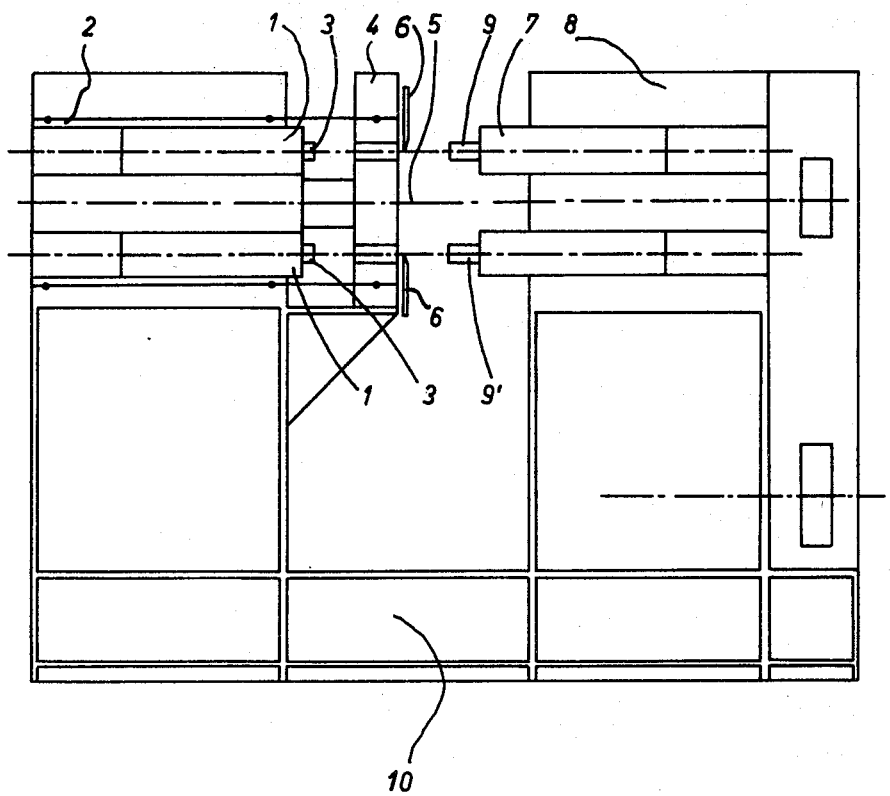
FIG. 1 is a side view of the lathe.

The lathe shown in FIG. 1 comprises rotating spindles or headstocks 1 sliding in a mounting in a member forming a turret 2 which is able to turn in frame 10 on the lathe. In front of this turret, the cutting tools holder 6 with tools 6a, radially mounted on the carrier 4 integral with frame 10 are able to moved radially.

Tools 9, working from the end, slide in a mounting in the tool holder 8 integral with frame 10, can be moved axially.

Figure 2:
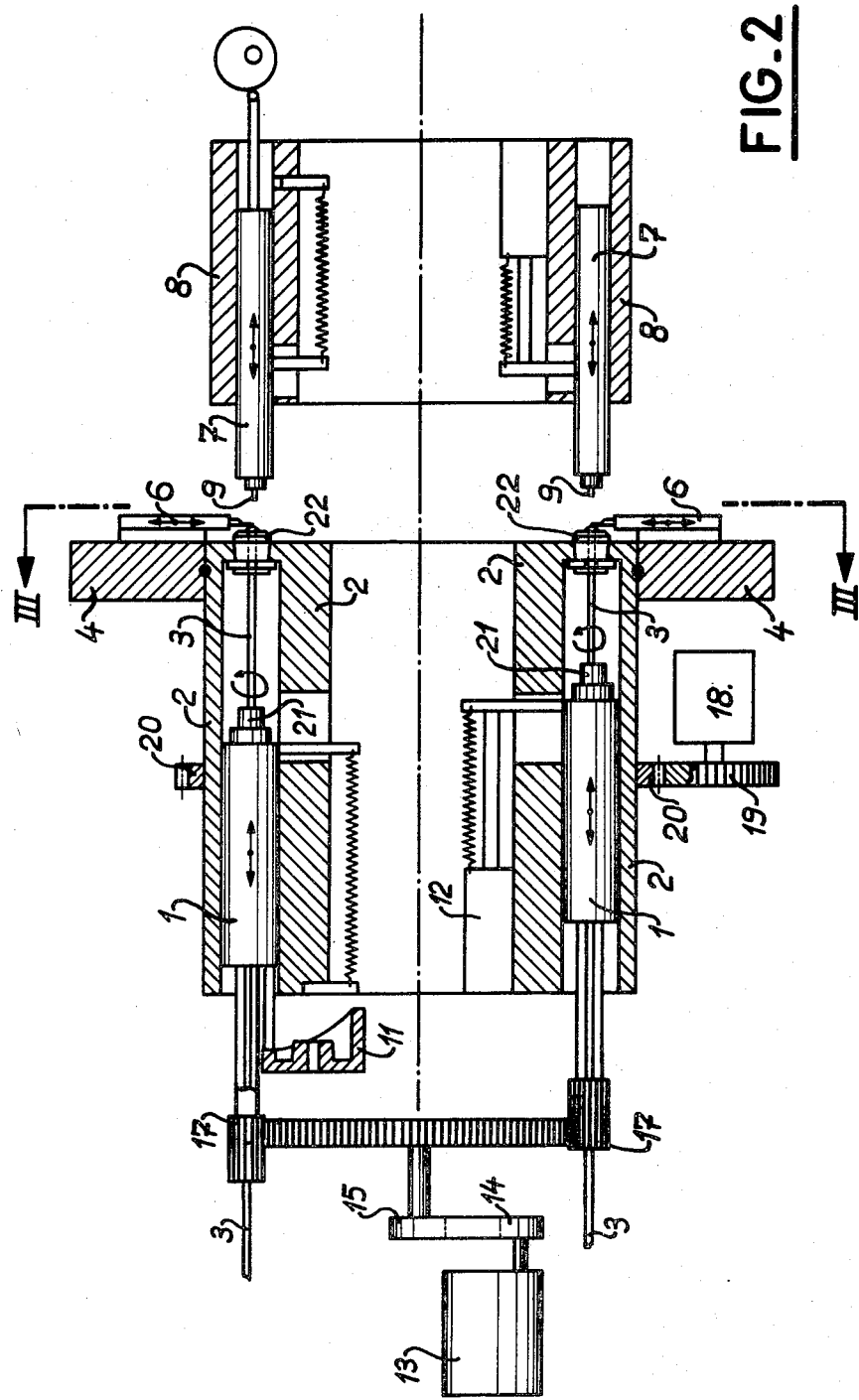
FIG. 2 is an enlarged and detailed view of a part of FIG. 1 and showing the means by which the relative movements of the headstocks and tools are made.

FIG. 2 shows the working of the lathe in more detail.

The headstocks 1 can slide in turret 2 and are driven either by a cam 11, by a linear hydraulic, pneumatic or electric motor 12, by a hydraulic piston or by a step-by-step motor. As illustrated in FIG. 2, each of the headstocks 1 comprises a sleeve 1a which is slidable longitudinally in a bore in the turret 2 and a hollow spindle rotatable in the sleeve and provided at its forward end with a chuck 21. An arm 1b on the sleeve 1a extends through an opening in the turret wall and is connected with a spring 27 which acts on the headstock to bias it toward the left as viewed in FIG. 2 to a retracted position. The headstock at the upper portion in FIG. 2 is movable toward the right by a rotatable cam 11 engaging a cam follower 11a on the sleeve 1a of the headstock. The headstock at the lower position in FIG. 2 is movable toward the right by a motor 12 having a longitudinally shaft 12a engaging the arm 1b of the headstock.

The spindles of these headstocks are rotated by motor 13 which drives them by means of pulleys 14, 15 and gearing 16 and 17 but each can be driven by their own motors or by hydraulic means. The gear 17 is sufficiently long to permit longitudinal movement of the respective headstock while maintaining a driving connection with gear 16. The shaft 17 is hollow so that a bar 3 to be machined can be fed through it.

Turret 2 can be rotated by step-by-step motor 18 through pinion 19 and crown 20 and, possibly, by a hydraulic piston and a rack or by a Maltese Cross device.

The bar 3 to be machined is held on one side by chuck 21 mounted on headstock 1 and by the guiding barrels 22 which can be static or rotatable according to the type of bar to be worked.

Figure 4:
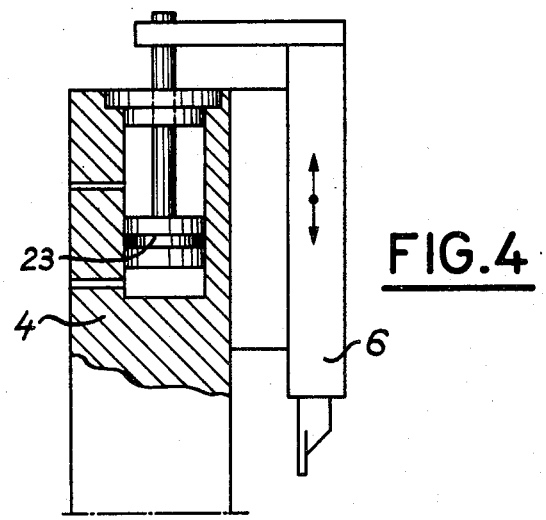
FIG. 4 is a detail showing the movement of a radial tool by means of a hydraulic piston.
Figure 5:
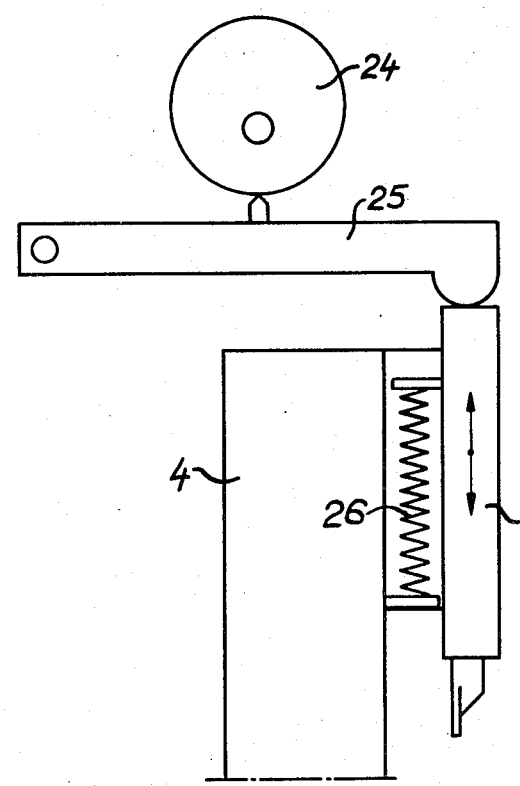
FIG. 5 is a detail showing the movement of a radial tool made by means of a cam.

The radial working tools are cutters 6a sliding in a mounting on tool holder 4 able to be operated by a double acting linear motor with a piston 23 as shown in FIG. 4 or by a cam device 24, lever 25 and spring 26 as shown in FIG. 5 similarly able to be driven by a single acting linear motor with a return spring or an electromagnet.

Figure 3:
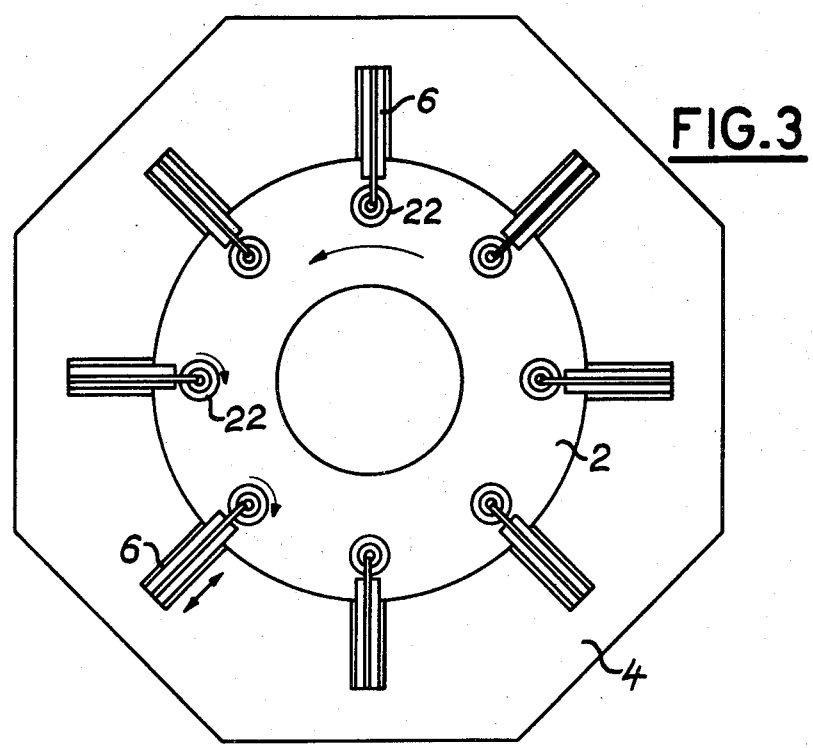
FIG. 3 is a view according to III—III of FIG. 2.

The lathe as illustrated in FIG. 3 comprises a turret 2 having eight rotatable headstocks and having, as a result, eight guiding barrels 22 for the bars to be machined. Eight radial tools 6 slide in a mounting on a tool holder 4 integral with the frame, not shown in FIG. 3. Similarly, in this case, the tool holder 8 also carries eight end working tools 9.

It is apparent that the number of eight headstocks is merely chosen as an example, the lathe able to be fitted with any number of headstocks between a maximum of 12 and a minimum of two.

Figure 6:
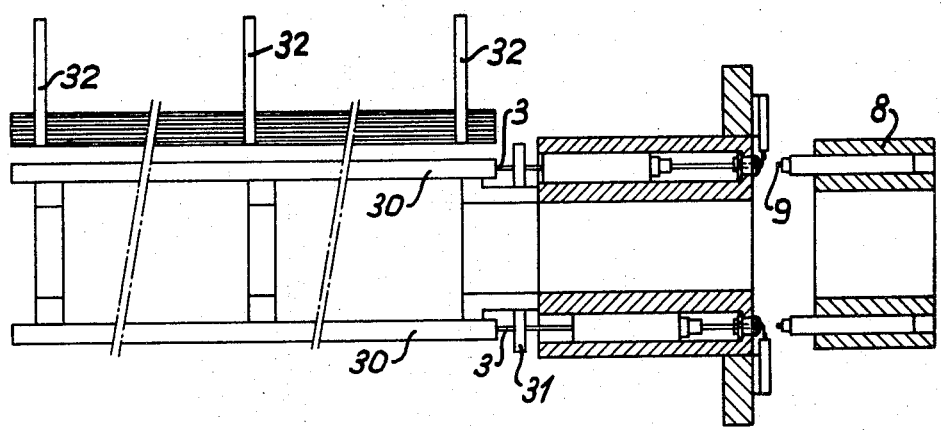
FIG. 6 is a schematic view of a feed device for feeding bars to the lathe.

FIG. 6 schematically shows the automatic lathe feed device for bars by means of the known usual guide bars 30.

When the bar is finished and the chuck 31 which advances the bar is empty and closes, it activates one of the tools 9 on the tool-holder 8 which consists of an extractor for the remainder of the bar. This extractor being of the known type it is not shown.

Simultaneously, the guide bar 30 which is situated under the bar distributor 32 opens and a bar 3 falls into the bar which next closes. The bar 3 is then pushed by a thrust device on the bar which, being known, is not shown.

What is claimed is:

1. Automatic lathe for use in the watchmaking field to machine bars, comprising a frame, a turret rotatably mounted thereon, means for rotating said turret at least two headstocks forming holders for the said bars being parallel and axially slidably and rotatably mounted in the said turret and at least two parallel guiding barrels spaced from and in line with said headstocks to engage the other ends of the said bars, a first carrier mounted stationary on the said frame surrounding said guiding barrel and carrying at least two radial tool holders being radially displaceable and a second carrier mounted stationary on the said frame spaced from the said first carrier and carrying at least two parallel end tool holders being axially displaceable, the number of the said headstocks, said guiding barrels and said radially and end tool holders being equal, and means for the longitudinal movement and rotation of said headstocks in the said turret.

2. Automatic lathe according to claim 1, characterized by the fact that the said means for longitudinal movement works on each individual headstock.

3. Automatic lathe according to claim 1, characterized by the fact that the said means for longitudinal movement works on all the headstocks.

4. Automatic lathe according to claim 1, characterized by the fact that the means for rotating the said headstocks works during the rotation of the turret.

5. Automatic lathe according to claim 1, characterized by the fact that it comprises an automatic loader for supplying said bars to said headstocks.

6. An automatic lathe according to claim 1, thereby characterized that said headstock comprises a sleeve that is longitudinally slidable in said turret and a hollow spindle provided with a chuck rotatable in said sleeve.

7. An automatic lathe according to claim 1, thereby characterized that the means for rotating the headstocks comprises a central gear coaxial with said turret, means for driving said central gear and a gear for each of said headstocks driven by said central gear.

8. An automatic lathe according to claim 1, thereby characterized that said guiding barrels are rotatable in said turret.

9. An automatic lathe according to claim 1, characterized by means for biasing said head to move longitudinally in a direction away from said guiding barrels to a retracted position.

* * * * *